United States Patent [19]

Plummer

[11] Patent Number: 5,205,102
[45] Date of Patent: Apr. 27, 1993

[54] CORNER FASTENER FOR HOLLOW SECTION MEMBERS

[75] Inventor: David D. Plummer, Hudson, Wis.

[73] Assignee: Andersen Corporation, Bayport, Minn.

[21] Appl. No.: 687,229

[22] Filed: Apr. 18, 1991

[51] Int. Cl.⁵ .............................................. E04C 2/38
[52] U.S. Cl. ................................. 52/656.9; 403/402; 52/656.2
[58] Field of Search ............. 403/403, 402, 260, 297, 403/292, 329; 52/656, 475

[56] References Cited

U.S. PATENT DOCUMENTS

| | | |
|---|---|---|
| 111,128 | 1/1871 | Linscott . |
| 1,242,815 | 10/1917 | Kohler . |
| 1,672,419 | 6/1928 | Lehman . |
| 1,817,162 | 8/1931 | Mulligan . |
| 2,395,673 | 2/1946 | Krantz ................... 189/76 |
| 2,538,138 | 1/1951 | Webster ................. 189/46 |
| 2,872,711 | 2/1959 | Killebrew ............... 20/11 |
| 2,916,112 | 12/1959 | Kiehl ..................... 189/75 |
| 3,051,517 | 8/1962 | Yalen ..................... 287/54 |
| 3,200,813 | 8/1965 | Nelson ................... 189/36 |
| 3,592,493 | 7/1971 | Goose .................... 52/656 |
| 3,642,310 | 2/1972 | Hudson ................... 287/54 |
| 3,677,433 | 7/1972 | Collins ................... 220/4 |
| 3,782,054 | 1/1974 | Goss, Jr. ................ 52/758 |
| 3,829,226 | 8/1974 | Kreusel .................. 403/295 |
| 3,848,390 | 11/1974 | Anderson et al. ........ 52/758 |
| 3,854,245 | 12/1974 | Anderson ................ 49/449 |
| 3,866,380 | 2/1975 | Benson ................... 52/656 |
| 3,899,258 | 8/1975 | Matthews ............... 403/292 |
| 3,955,298 | 5/1976 | Kapstad .................. 52/656 |
| 4,076,438 | 2/1978 | Bos ....................... 403/402 |
| 4,090,799 | 5/1978 | Crotti et al. ............ 403/401 |
| 4,124,322 | 11/1978 | Parisien ................. 403/295 |
| 4,190,375 | 2/1980 | Berry .................... 403/260 |
| 4,193,245 | 3/1980 | Johnson ................. 52/656 |
| 4,222,209 | 9/1980 | Peterson ................ 52/172 |
| 4,296,587 | 10/1981 | Berdan .................. 52/788 |
| 4,336,645 | 6/1982 | Bucci .................... 403/402 |
| 4,380,110 | 4/1983 | Harig .................... 29/525 |
| 4,596,488 | 6/1986 | Schendan ............... 403/402 |
| 4,635,410 | 1/1987 | Chumbley ............... 52/63 |
| 4,683,634 | 8/1987 | Cole ..................... 403/402 |
| 4,862,612 | 9/1989 | Sugihara et al. ........ 403/402 |
| 5,010,708 | 4/1991 | Evans et al. ........... 403/402 |
| 5,105,581 | 4/1992 | Slocomb, Jr. .......... 403/403 |

FOREIGN PATENT DOCUMENTS

| | | |
|---|---|---|
| 1105596 | 4/1961 | Fed. Rep. of Germany . |
| 1193314 | 5/1965 | Fed. Rep. of Germany . |
| 685067 | 1/1967 | Netherlands . |
| 1264534 | 2/1972 | United Kingdom . |

*Primary Examiner*—David A. Scherbel
*Assistant Examiner*—Michele A. Van Patten
*Attorney, Agent, or Firm*—Merchant, Gould, Smith, Edell, Welter & Schmidt

[57] ABSTRACT

A corner fastener (10) is used for securing a first frame member (11) to a second frame member (12). The corner fastener (10) includes a body sized to be inserted in a cavity (11c) of the first frame member (11). Locking tabs (22 and 32) have first ends (22a and 32a) operatively connected to the body and second ends (22b and 32b) free to move between an unengaged position and an engaged position. The locking means have detent engaging members (24 and 34). The body has a fastening member aperture (27a and 37a). The aperture is in general axial alignment with an opening (12k), wherein when the body is positioned in the cavity and when a fastening member (50) is inserted in the opening and the aperture, the detent engaging member is locked in a detent by the fastening member, thereby fastening the first and second frame members together.

15 Claims, 2 Drawing Sheets

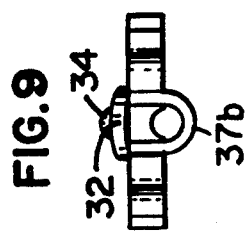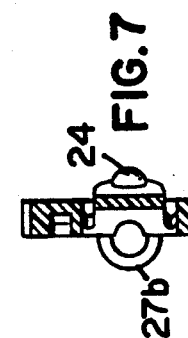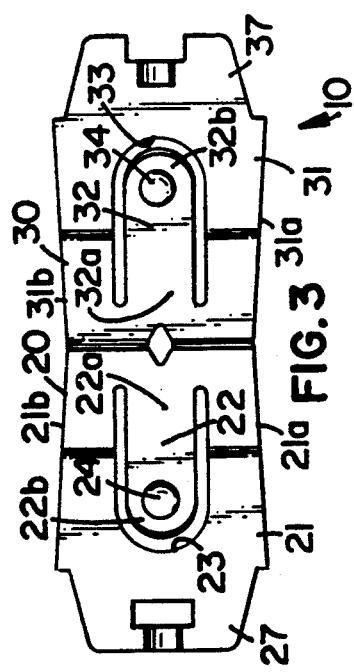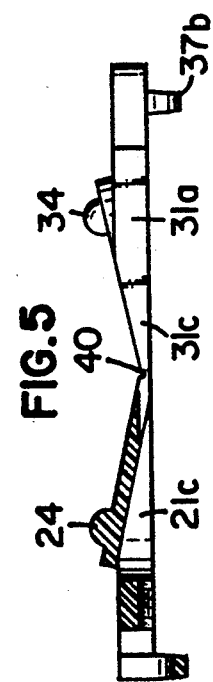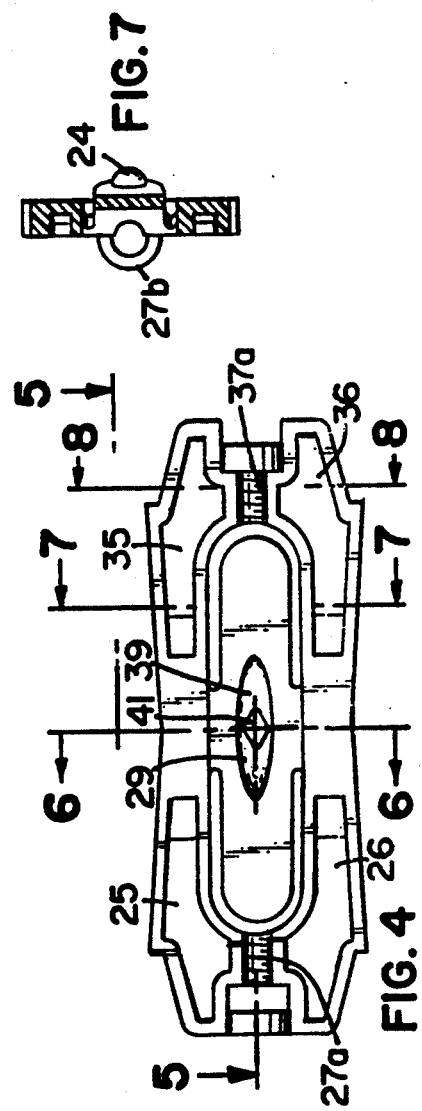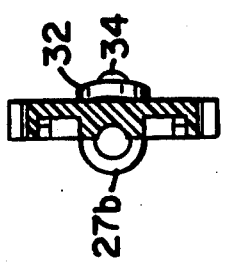

CORNER FASTENER FOR HOLLOW SECTION MEMBERS

BACKGROUND OF THE INVENTION

1. Field of the Invention

This invention relates generally to corner fasteners for use in securing first and second frame members together to form a frame and more particularly to a corner fastener which is insertable into a cavity of a frame member and utilizes a fastening member to lock a detent engaging member in a detent, thereby securely fastening the frame members together to form a frame corner.

2. Description of the Prior Art

Corner locks are well known in the window and door construction industry. Corner locks are used to join and secure two frame members together. The frame members may have a 45° miter and when they are brought together, they form a 90° corner. Alternately, the frame members may have ends which are 90° and the frame members are perpendicularly abutted next to each other to form a 90° corner. The corner lock functions not only to secure the two frame members together, but also, ideally, to properly align the frame members so that the two frame members are properly aligned when the frame members are secured to each other. It is also possible that the joint angles do not form a 90° but may be other angles.

The present invention addresses the problems associated with the prior art by providing a corner lock which can quickly fasten together two hollow composite members, one of which has a cavity, at their corners without crushing. The corner fastener is economical, easy to assemble and has a strong locking action without crushing any composite material which the frame members may be made from. The frame members are securely drawn together as the fastening member is tightened and provides for reinforcement of the hollow section as well as aiding in the alignment of both frame members.

BRIEF DESCRIPTION OF THE DRAWINGS

FIG. 3 is a top plan view of the corner lock shown in FIG. 2 shown in an unfolded orientation.

FIG. 4 is a bottom plan view of the corner lock shown in FIG. 3.

FIG. 5 is a cross-sectional view, taken generally along the lines 5—5, of the corner lock of FIG. 4.

FIG. 6 is a cross-sectional view, taken generally along the lines 6—6, of the corner lock of FIG. 4.

FIG. 7 is a cross-sectional view of the corner lock of FIG. 4, taken generally along the lines 7—7.

FIG. 8 is a cross-sectional view of the corner lock of FIG. 4, taken generally along the lines 8—8.

FIG. 9 is a side elevational view of the corner lock shown in FIG. 3.

SUMMARY OF THE INVENTION

Figure 2:
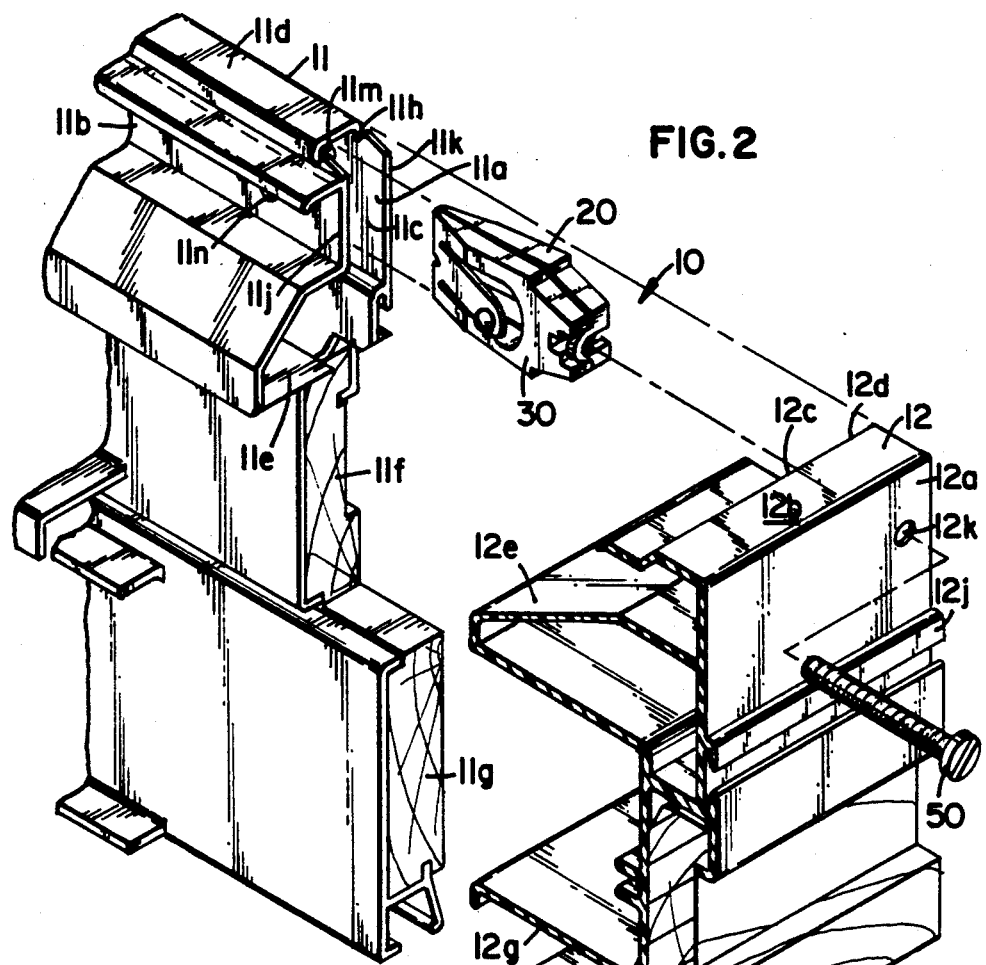
FIG. 2 is an exploded perspective view of the two frame members and corner lock, as shown in FIG. 1.

The present invention is a corner fastener for use in securing first and second frame members together to form a corner of a frame. The first frame has spaced apart outside and inside walls, thereby defining a cavity, the cavity defining at least one detent. The second frame has an outer wall with the outer wall having an opening in general axial alignment with the cavity. The fastener includes a body generally sized to be inserted into the cavity. A locking means is provided which has a first end operatively connected to the body and a second end free to move between an unengaged position and an engaged position. The locking means has a detent engaging member. The body defines a fastening member aperture. The aperture is in general axial alignment with the opening, wherein when the body is positioned in the cavity and when a fastening member is inserted in the opening and the aperture, the detent engaging member is locked in the detent by the fastening member, thereby fastening the first and second frame members together.

In a preferred embodiment, the cavity of the first frame member defines two detents and the locking member has both first and second detent engaging members. Still further, the locking means is preferably normally biased away from the body and toward the detents.

In another embodiment, the invention is a frame corner having a first member having spaced apart outside and inside walls, thereby defining a cavity, the cavity defining at least one detent. A second frame member has an outer wall, the outer wall having an opening in general alignment with the cavity. A corner fastener is used in securing the first and second frame members together. The fastener including a body generally sized to be inserted into the cavity and locking means having a first end operatively connected to the body and a second end free to move between an unengaged position and an engaged position. The locking means has a detent engaging member. The body defines a fastening member aperture. The aperture is in general alignment with the opening. The frame corner also includes a fastening member for operative engagement with the locking means, wherein when the body is positioned in the cavity, and when the fastening member is inserted in the opening and the aperture, the detent engaging member is locked in the detent by the fastening member, thereby fastening the first and second frame members together to form a frame corner.

In a preferred embodiment, the cavity of the first frame member defines two detents and the locking member has both first and second detent engaging members. Still further, the locking means is preferably normally biased away from the body and toward the detents.

DETAILED DESCRIPTION OF THE PREFERRED EMBODIMENT

Referring to the drawings, wherein like numerals represent like parts throughout the several views, there is generally disclosed at 10 a corner lock fastener. The corner lock fastener is used to secure two frame members 11 and 12 together to form a corner. The first frame member 11 and second frame member 12 may take any suitable configuration, depending upon the ultimate configuration of the frame to be constructed. Such frame members are well known in the window and door construction industry. As previously stated, the outside profile of the frame members 11 and 12 will depend upon the specific aesthetics which the designer wishes to create.

Figure 1:
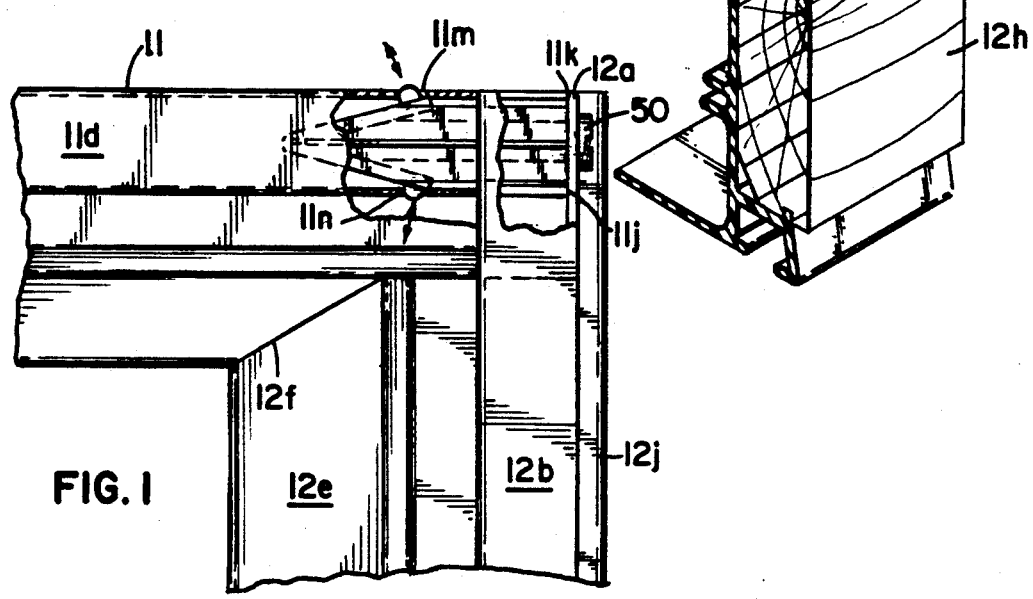
FIG. 1 is a front plan view of two frame members joined together in accordance with the present invention.

The first frame member 11 has an outside wall 11a and an inside wall 11b. As can be seen in FIG. 1, the inside wall 11a and outside wall 11b are operatively connected by an appropriate top member 11d and bottom member 11e. The outside wall 11a is generally parallel to and spaced from the inside wall 11b to form a cavity 11c. Two holes 11m and 11n are formed in the side walls 11a and 11b. The holes as will be more fully described hereafter, form a detent. The bottom member 11e is configured with other sections so as to allow a wooden frame member 11f to be operatively connected thereto. Still further, an additional wooden frame member 11g may be operatively connected beneath the first wooden frame member 11f. The exact details of the structure are not discussed in that any suitable configuration may be utilized. However, it is the cavity 11c which is created between the outside wall 11a and inside wall 11b, as well as the top member 11d, which are necessary to form a cavity to receive the corner lock fastener 10. While the cavity is shown as a continuous channel in the frame 11, it is understood that the cavity need not be continuous, but for ease of construction and design, usually is a continuous channel. At the other end (not shown) of the frame member 11, a similar cavity is provided for receiving another corner lock fastener.

The second frame member 12 has an outer wall 12a operatively connected to a top member 12b. The top member 12b has a notch 12c formed therein. The notch 12c is formed so that the top member 12b, along its leading edge 12d, may engage the notch 11h in the top member 11d. A secondary top member 12e is also operatively connected to the outer wall 12a and is positioned below the top member 12b. The secondary member 12e has an angle 12f at its first end which is approximately 45°. This allows the second frame member 12 to be brought into position with the first frame member 11. The remainder of the profile 12g is shown in FIG. 2 and may take any suitable shape depending upon the design construction of the window and the corresponding construction of the first frame member 11. The frame member 12 is adapted to be placed in position adjacent the first frame member 11 so that a 90° corner is formed. For instance, the wood member 12h has a notch formed therein so that it may rest on top of the wood member 11g. When the first and second frame members 11 and 12 are brought together, the leading edges 11j and 11k contact the inside surface of the outer wall 12a, as best shown in FIG. 1. A downwardly depending flange 12j is also operatively connected to the outside of the outer 12a. The outer wall 12a has an opening 12k through the outer wall. The opening 12k is in general axial alignment with the cavity 11c, when the frame members 11 and 12 are in position to be secured.

While a complete frame corner is shown in FIGS. 1 and 2, a completed frame is not shown in the drawings. From the foregoing description however, it is clear that a completed frame would include two frame members 11 and two frame members 12. The two frame members 11 would have cavities at each end and the two frame members 12 would have openings in general axial alignment with the cavities. Then four corner fastener locks 10, as will be more fully described hereinafter, would be used to complete the frame.

Referring to FIGS. 3-9, the corner lock fastener 10 has a first section 20 operatively connected to a second section 30. Preferably, the corner lock fastener 10 is of a single piece construction and the first section 20 is operatively connected to the second section 30 along a recess 40. The recess 40 provides for a thin strip of material underneath the recess which will allow the first section 20 to be folded over on top of the second section 30, as shown in FIG. 2.

Section 20 has a base portion 21. The base portion 21 is generally rectangular in shape, when viewed from above, as shown in FIG. 3. However, the two sides, 21a and 21b, taper gradually inward toward the recess 40. When viewed from the side, as shown in FIG. 5, it can be seen that the base 20 has an inclined ramp portion 21c which is narrower proximate the recess 40. As will be discussed more fully hereinafter, the tapered sides 21a and 21b and the inclined ramp portion 21c provide for a shape which allows for easier insertion into the cavity 11c. A locking tab 22 is formed in the base portion 21. As can be seen in FIGS. 2 and 5, the locking tab 22 has a first end 22a which is operatively connected to the base portion 21 as an integral portion. The second end 22b is separated from the base portion 21 by means of a horseshoe shaped opening 23. A detent engaging member 24 is operatively connected to the second end 22b by being formed as an integral portion thereof. As can be seen more fully in FIG. 5, the locking tab 22 is normally biased outward away from the base portion 21. In this embodiment, biased outward simply means the locking tab is normally in the position as shown in FIGS. 2 and 5. Because of the material used, polyethylene, and being attached at one end, the second end 22b may be pushed into the center of the section 20, thereby reducing the thickness so as to be insertable into the cavity 11c. However, the locking tab 22 may be moved between an engaged position and an unengaged position as will be more fully described hereafter. Cavities 25 and 26 are formed in the first section 20 for ease of manufacturing purposes to keep the wall thicknesses more uniform. The first section 20 also includes a fastening member receiving portion 27. The fastening member receiving portion 27 includes a one-half cylindrical threaded portion 27a, as shown in FIG. 4, as well as a U-shaped guide member 27b.

Section 30 has a base portion 31. The base portion 31 is generally rectangular in shape, when viewed from above, as shown in FIG. 3. However, the two sides, 31a and 31b, taper gradually inward toward the recess 40. When viewed from the side, as shown in FIG. 5, it can be seen that the base 30 has an inclined ramp portion 31c which is narrower proximate the recess 40. As will be discussed more fully hereinafter, the tapered sides 31a and 31b and the inclined portion 31c provide for a shape which allows for easier insertion into the cavity 11c. A locking tab 32 is formed in the base portion 31. As can be seen in FIGS. 2 and 5, the locking tab 32 has a first end 32a which is operatively connected to the base portion 31 as an integral portion. The second end 32b is separated from the base portion 31 by means of a horseshoe shaped opening 33. A detent engaging member 34 is operatively connected to the second end 32b by being formed as an integral portion thereof. As can be seen more fully in FIG. 5, the locking tab 32 is normally biased outward away from the base portion 31. In this embodiment, biased outward simply means the locking tab is normally in the position as shown in FIGS. 2 and 5. Because of the material used, polyethylene, and being attached at one end, the second end 32b may be pushed into the center of the section 30, thereby reducing the thickness so as to be insertable into the cavity 11c. However, the locking tab 32 may be moved between an engaged position and an unengaged position as will be more fully described hereafter. Cavities 35 and 36 are formed in the first section 30 for ease of manufacturing purposes to keep the wall thicknesses more uniform. The first section 30 also includes a fastening member receiving portion 37. The fastening member receiving portion 37 includes a one-half cylindrical threaded portion 37a, as shown in FIG. 4, as well as a U-shaped guide member 37b.

The corner lock fastener 10 is preferably constructed from a single piece injection molded plastic part. The material may be of any suitable material such as polyethylene. When formed as a single piece and having two sections as previously described, the first and second sections 20 and 30 are folded over on top of each other along the recess 40. An opening 41 and concavities 29 and 39 may be formed to allow for the fastening member 50 to pass through the fastener 10. When the two sections are folded on top of each other, the one half cylindrical thread portions 27a and 37a form a threaded aperture for the fastening member 50. Further, the U-shaped guide members 27b and 37b are adjacent each other and the two U-shaped members define a cylindrical opening to guide the fastening member 50 into the threaded aperture portions 27a and 37a. The guide members 27b and 37b also are designed to create a very slight snap fit to help hold the folded assembly together until insertion into the cavity 11c.

The present one-piece design, with fold over construction, allows for the corner lock fastener 10 to be easily manufactured and used. However, it is understood that other methods of manufacturing a design are certainly possible and still come within the present invention. For instance, it would be possible to manufacture a one-piece corner lock fastener that does not fold over upon itself.

In operation, the first section 20 is folded over on top of the second section 30. Then, the assembler depresses the locking tabs 22 and 32 toward the center of the fastener. This rotates the locking tabs 22 and 32 inward around the first ends 22a and 32a. This decreases the thickness of the overall fastener 10 as the detent engaging members 24 and 34 are rotated into the center of the fastener in an unengaged position. Then, the fastener 10 is inserted into the cavity 11c. The tapered body of the fastener assists in the easy insertion. Typically, the assembler will be depressing the tabs 22 and 32 by pushing in on the detent engaging members 24 and 34. Then, when the assembler's fingers reach the leading edges 11j and 11k, it is necessary for the assembler to release the detent engaging member in order to proceed with the insertion of the lock fastener 10 into the cavity 11c. However, at this time, the inside wall 11b and outside wall 11a prevent the locking tabs 22 and 32 from returning to their normal position by continuing to apply pressure to the members 24 and 34. Then, as the fastener 10 is further inserted, the detent engaging members 24 and 34 are positioned in alignment with the detent or holes 11m and 11n. The positioning of the holes 11m and 11n will of course be dependent upon the positioning of the detent engaging members 24. The function of the holes, or detents, 11m and 11n is to allow the tabs to move outward and provide a locking position against further longitudinal movement of the fastener 10. While an indentation may be utilized, it has been found that holes provide a more positive locking mechanism. Upon reaching the detent holes 11m and 11n, the locking tabs 22 and 24 will spring outward, due to their normal bias and the detent engaging members 24 and 34 will be in position in the detents 11m and 11n. This initially holds the lock fastener 10 in position. Then, the second frame member 12 is abutted the second frame member 12 to form a 90° corner. The opening 12k is in alignment with the cavity 11c and is also in alignment with the cylindrical threaded portions 27a and 37a as well as the guide members 27b and 37b. A fastening member 50, such as a screw, is then inserted through the opening 12k and between the guide members 27b and 37b. Then, the threaded fastening member engages the threaded portions 27a and 37a. As the fastening member 50 is continued to rotate, the fastening member is drawn further into the lock fastener 10. The fastening member 50 is continued to be threaded until the head of the fastening member 50 contacts the outer wall 12a. At this position, the fastener member 50 is designed with such a diameter that the screw does not allow the detent engaging members or the locking tabs to be compress further inward to allow the release of the lock fastener 10. It is also recognized that it is not necessary that the tabs 22 and 32 be biased outward. It would be possible for the movement inward of the fastening member 50 to move the tabs 22 and 32 into the holes 11m and 11n. However, having the tabs 22 and 32 biased outward is preferred.

The present invention allows for a corner fastener which is economical, easy to use and has a strong locking action without crushing any composite material which the frame member profiles may be made from. The frame members are securely drawn together as the fastening member is tightened and further provides for reinforcement of the hollow section as well as aiding in the alignment of both frame members.

Other modifications of the invention will be apparent to those skilled in the art in light of the foregoing description. This description is intended to provide specific examples of individual embodiments which clearly disclose the present invention. Accordingly, the invention is not limited to these embodiments or the use of elements having specific configurations and shapes as presented herein. All alternative modifications and variations of the present invention which follow in the spirit and broad scope of the appended claims are included.

I claim:

1. A corner fastener for use in securing first and second frame members together to form a corner of a frame, the first frame having spaced apart outside and inside walls thereby defining a cavity, the cavity defining at least one detent, the second frame having an outer wall, the outer wall having an opening in general axial alignment with the cavity, said fastener comprising:

(a) a body generally sized to be inserted in the cavity, said body comprising a first section operatively connected to a second section by hinge means, wherein said first and second sections are generally adjacent when manufactured, but are folded on top of each other during use;

(b) locking means having a first end operatively connected to said body and a second end free to move between an unengaged position and an engaged position, said locking means having a detent engaging member;

(c) said body defining a fastening member aperture, said aperture in general axial alignment with the opening, wherein when, said body is positioned in the cavity and when a fastening member is inserted in the opening and said aperture, said detent engaging member is locked in the detent by the fastening member, thereby fastening the first and second frame members together.

2. The corner fastener of claim 1, wherein the cavity of the first frame member defines two detents and said locking member having first and second detent engaging members, said first and second detent engaging members located so that when said body is inserted in the cavity, said detent engaging members are proximate the detents.

3. The corner fastener of claim 2, wherein said body comprises:
   (a) said first detent engaging member has a first end operatively connected to said first section and a second end free to move between an unengaged and an engaged position; and
   (b) said second detent engaging member has a first end operatively connected to said second section and a second end free to move between an unengaged and an engaged position.

4. The corner fastener of claim 3, wherein said first section defines one half of the fastening member aperture and said second section defines one half of the fastening member aperture, wherein when said sections are folded on top of each other, each of the one half apertures combine to define the fastening member aperture.

5. The corner fastener of claim 4, wherein said fastening member is threaded and has an entry cylinder.

6. The corner fastener of claim 1, wherein said second end of said locking means is normally biased away from said body and toward the detents, wherein prior to insertion in the cavity, said second end of said locking means is pushed in toward said body so that said body may be inserted into the cavity, and when in the cavity the biased second end moves said detent engaging member into the detent.

7. The corner fastener of claim 1, wherein said body has a leading portion which is tapered in thickness and width to guide insertion of said fastener.

8. A corner fastener for use in securing first and second frame members together to form a corner of a frame, the first frame having spaced apart outside and inside walls thereby defining a cavity, the cavity defining a first and second detent engaging member, the second frame having an outer wall, the outer wall having an opening in general axial alignment with the cavity, said fastener comprising:
   (a) a body generally sized to be inserted in the cavity said body comprising:
      (i) a first section operatively connected to a second section by hinge means, wherein said first and second sections are generally adjacent when manufactured, but are folded on top of each other during use;
      (ii) said first detent engaging member has a first end operatively connected to said first section and a second end free to move between an unengaged and an engaged position; and
      (iii) said second detent engaging member has a first end operatively connected to said second section and a second end free to move between an unengaged and an engaged position; and
   (b) said body defining a fastening member aperture, said aperture in general axial alignment with the opening, wherein when, said body is positioned in the cavity and when a fastening member is inserted in the opening and said aperture, said detent engaging member is locked in the detent by the fastening member, thereby fastening the first and second frame members together.

9. A frame corner comprising:
   (a) a first frame having spaced apart outside and inside walls thereby defining a cavity, the cavity defining at least one detent;
   (b) a second frame having an outer wall, the outer wall having an opening in general alignment with the cavity; and
   (c) a corner fastener for use in securing said first and second frame members together, said fastener comprising:
      (i) a body generally sized to be inserted in the cavity, said body comprising a first section operatively connected to a second section by hinge means, wherein said first and second sections are generally adjacent when manufactured, but are folded on top of each other during use;
      (ii) locking means having a first end operatively connected to said body and a second end free to move between an unengaged position and an engaged position, said locking means having a detent engaging member;
      (iii) said body defining a fastening member aperture, said aperture in general axial alignment with the opening; and
      (iv) a fastening member for operative engagement with said locking means wherein said body is positioned in the cavity and when a fastening member is inserted in the opening and said aperture, said detent engaging member is located in the detent by the fastening member, thereby fastening the first and second frame members together.

10. The frame corner of claim 9, wherein the cavity of the first frame member defines two detents and said locking member having first and second detent engaging members, said first and second detent engaging members located so that when said body is inserted in the cavity, said detent engaging members are proximate the detents.

11. The frame corner of claim 10, wherein said body comprises:
   (a) said first detent engaging member has a first end operatively connected to said first section and a second end free to move between an unengaged and an engaged position; and
   (b) said second detent engaging member has a first end operatively connected to said second section and a second end free to move between an unengaged and an engaged position.

12. The frame corner of claim 11, wherein said first section defines one half of the fastening member aperture and said second section defines one half of the fastening member aperture, wherein when said sections are folded on top of each other, each of the one half apertures combine to define the fastening member aperture.

13. The frame corner of claim 12, wherein said fastening member is threaded and has an entry cylinder.

14. The frame corner of claim 9, wherein said second end of said locking means is normally biased away from said body and toward the detents, wherein prior to insertion in the cavity, said second end of said locking means is pushed in toward said body so that said body may be inserted into the cavity, and when in the cavity the biased second end moves said detent engaging member into the detent.

15. The frame corner of claim 9, wherein said body has a leading portion which is tapered in thickness and width to guide insertion of said fastener.

* * * * *